(12) United States Patent
Chaiken

(10) Patent No.: US 6,453,461 B1
(45) Date of Patent: Sep. 17, 2002

(54) METHOD AND APPARATUS FOR TESTING ASL PLUG AND PLAY CODE IN AN ACPI OPERATING SYSTEM

(75) Inventor: Craig L. Chaiken, Tomball, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/329,039

(22) Filed: Jun. 9, 1999

(51) Int. Cl.$^7$ .................................................. G06F 9/44
(52) U.S. Cl. ...................... 717/124; 717/121; 717/109; 713/2; 713/1
(58) Field of Search .................... 717/1, 2, 11, 124, 717/109, 121; 713/1, 2, 300, 200, 100, 25; 714/703, 742; 710/104, 260; 709/215

(56) References Cited

U.S. PATENT DOCUMENTS

| | | | | |
|---|---|---|---|---|
| 5,937,200 A | * | 8/1999 | Frid et al. .................... 710/264 |
| 5,938,765 A | * | 8/1999 | Dove et al. ..................... 713/1 |
| 5,999,730 A | * | 12/1999 | Lewis ............................ 717/2 |
| 6,131,131 A | * | 10/2000 | Bassman et al. ............... 710/15 |
| 6,167,511 A | * | 12/2000 | Lewis ............................ 713/2 |
| 6,173,417 B1 | * | 1/2001 | Merrill ......................... 714/15 |
| 6,185,677 B1 | * | 2/2001 | Nijhawan ....................... 713/2 |
| 6,219,742 B1 | * | 4/2001 | Stanley ........................ 710/260 |
| 6,266,776 B1 | * | 7/2001 | Sakai .......................... 713/300 |
| 6,269,392 B1 | * | 7/2001 | Cotichini et al. ........... 709/200 |
| 6,295,566 B1 | * | 9/2001 | Stufflebeam ................. 710/103 |
| 6,300,863 B1 | * | 10/2001 | Cotichini et al. ............ 340/5.8 |
| 6,301,665 B1 | * | 10/2001 | Simonich et al. ........... 713/200 |

* cited by examiner

Primary Examiner—Gregory Morse
Assistant Examiner—Chameli C. Das
(74) Attorney, Agent, or Firm—Conley, Rose & Tayon, P.C.

(57) ABSTRACT

In a first aspect, the invention is a method for interfacing a generic program with the ASL code in an ACPI system. The method comprises storing information from a generic program in a shared memory; accessing the ASL code; and retrieving the stored information with the ASL code. In a second aspect, the invention is a method for testing ASL PnP code in an ACPI system. The method comprises identifying a configurable PnP device; disabling the identified configurable PnP device; testing the disabled, configurable PnP device for a configuration; and verifying that, for the tested configuration, the resulting current resources match the set resources. In variations of these aspects, the methods may be performed by instructions encoded on a computer-readable, program storage medium and used to program a computer.

32 Claims, 5 Drawing Sheets

METHOD AND APPARATUS FOR TESTING ASL PLUG AND PLAY CODE IN AN ACPI OPERATING SYSTEM

BACKGROUND OF THE INVENTION

1. Field of the Invention

This invention pertains generally to computer systems and, more particularly, computer systems employing an Advanced Configuration and Power Interface ("ACPI") operating system.

2. Description of the Related Art

Computers typically employ "operating systems" to manage the resources used during their operation. Computers generally perform their most basic functions in accordance with their operating system. An operating system is a program that runs other programs known as "applications programs," such as a word processor, invoked by the computer's user. The operating system also performs the elementary tasks associated with the computer's use, such as receiving input from the keyboard, sending output to a display or a printer, and controlling peripheral devices such as disk drives and printers. In some computers, the operating system might perform advanced tasks, such as maintaining security. Exemplary operating systems currently used include Windows®, the Microsoft Disk Operating System ("MS-DOS"), OS/2, Linux, and UNIX.

Some newer operating systems are implementing the Advanced Configuration and Power Interface ("ACPI"). The ACPI is a power management specification enabling an operating system to control the amount of power given to each device attached to the computer. Using the ACPI, the operating system can turn off peripheral devices not in use or power-up keyboards when touched. Although relatively new, the ACPI is already well known in the art. In fact, the entire specification is published and freely accessible over the World Wide Web of the Internet at <http://www.teleport.com/~acpi/>.

The ACPI specification contemplates its use in conjunction with operating systems employing a popular feature known as Plug and Play ("PnP"). Two current, exemplary PnP operating systems are Windows® 98 and Windows® NT. The PnP feature allows the computer's user to add new devices or to exchange old devices for new devices without setting configuration elements that identify the device within the computer's configuration. For present purposes, a "device" is any machine or component that attaches to a computer. Exemplary devices include, but are not limited to "peripheral" devices, e.g. disk drives, printers, mice, and modems, and "integral" devices, e.g., monitors and keyboards. Thus, in theory, the user can simply "plug" in the new device "and" the computer can "play" it without further intervention from the user.

One of the challenges in implementing a PnP operating system is testing the ASL PnP code during development. Under some operating systems, notably Windows® 98- and Windows® NT-based (now called Windows® 2000) ACPI operating systems, there is no general purpose application program interface for passing data to and from an ACPI control method. Thus, there is no way to automatically test the ACPI Source Language ("ASL") PnP code. The absence of a general purpose application program interface furthermore means that it is not possible to write and automated tested procedure that exercises ASL code such as that used for PnP support.

To test ASL PnP code, designers have therefore had to resort to manual techniques. One technique employs the Windows® device manager to change the configuration of the device and to use the ACPI HCT namespace viewer to verify that the configuration was changed as requested. This approach is manual and tedious. It is impractical for testing all combinations of PnP configurations, so testing shortcuts must be taken. For instance, testing might only address a portion of the possible PnP configurations rather than all of them. The shortcuts consequently open the door to potential, undetected PnP code errors.

The lack of a general purpose application program interface creates difficulties outside the area of ASL PnP code testing. There are a variety of functions that a designer might wish for the ASL code to perform. However, the inability to pass data to and from the ASL code from the ACPI operating system excludes this option for functions requiring passed data. Thus, the absence of a general purpose application program interface greater restricts designer flexibility.

The present invention is directed to resolving one or all of the problems mentioned above.

SUMMARY OF THE INVENTION

In a first aspect, the invention is a method for interfacing a generic program with the ASL code in an ACPI system. The method comprises storing information from a generic program in a shared memory; accessing the ASL code; and retrieving the stored information with the ASL code.

In a second aspect, the invention is a method for testing ASL PnP code in an ACPI system. The method comprises identifying a configurable PnP device; disabling the identified configurable PnP device; testing the disabled, configurable PnP device for a configuration; and verifying that, for the tested configuration, the resulting current resources match the set resources.

In variations of these aspects, the methods may be performed by instructions encoded on a computer-readable, program storage medium and used to program a computer.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The invention is, in its various aspects and in numerous alternative embodiments, a method and apparatus for interfacing a generic program with ASL PnP code in an ACPI operating system. A "generic program," for present purposes, is any program that might interface with ASL PnP code in an ACPI operating system. An "ACPI operating system," for present purposes, is an operating system employing the ACPI discussed above. Thus, an ACPI operating system employs PnP features. The term encompasses operating systems based on any currently known operating system, such as Windows®, the MS-DOS, OS/2, Linux, and UNIX, modified to implement ACPI. Alternative embodiments might particular employ an ACPI operating system base on either Windows® 98 or Windows® NT. More particularly, the invention may manifest itself in at least three aspects: a method, a computer-readable storage medium on which instructions for performing the method are encoded, and a computer programmed to perform the method.

Figure 1:
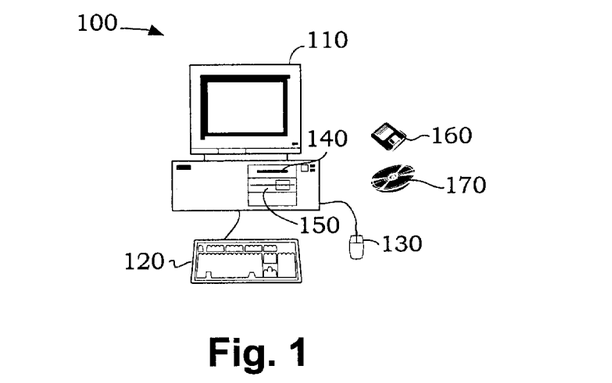
FIG. 1 is a plan view of one particular computer operating in accordance with the present invention.
Figure 2:
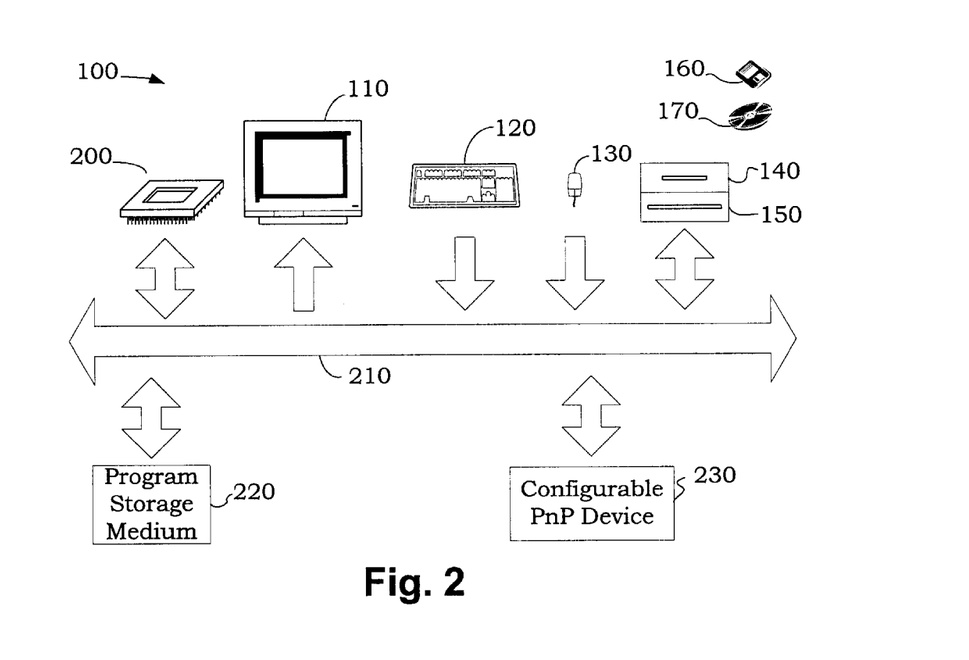
FIG. 2 is a functional block diagram of the computer in FIG. 1.

Turning now to drawings, FIGS. 1–2 depict a computer 100 capable of running on an ACPI operating system. FIG. 1 is a plan view of the computer 100 and FIG. 2 is a functional block diagram of the computer 100. The computer 100, in the particular embodiment illustrated, is a desktop personal computer. However, the invention is not so limited. The computer 100 may, for instance, be a laptop or palmtop computer, for instance, in alternative embodiments. In alternative embodiments, the computer 100 might not even be a personal computer, e.g., a workstation. The invention is not limited by the particular function or design of the computer 100, provided that it employs an ACPI operating system.

The computer 100, in this particular embodiment, includes a monitor 110, a keyboard 120, and a mouse 130 for user Input/Output ("I/O"). The computer 100 also includes a floppy disk drive 140 and an optical disk drive 150 that may be used to read a floppy disk 160 and an optical disk 170, respectively, if so desired. Each of these devices communicates with a processor 200 over a bus 210. The computer 100 also includes a computer readable program storage medium 220 and a configurable PnP device 230.

The type and nature of these elements of computer 100 will be highly implementation specific. For instance, the processor 200 may be practically any kind of processor, e.g., a digital signal processor or a microprocessor. Exemplary, commercially available processors include, but are not limited to an Alpha® processor, manufactured and sold by Compaq Computer Corporation, an AMD K6® processor, manufactured by Advanced Micro Devices, Inc., or a Pentium® class processor manufactured and sold by Intel Corporation. The bus 210, likewise, may operate under any standard or protocol supported by the ACPI specification or employable in an ACPI operating system. The program storage medium 220 may similarly be any type of read/write program storage medium. Typically, though, the program storage medium 220 will be what is known as Random Access Memory, or "RAM".

Returning to FIG. 2, most embodiments will include many configurable PnP devices as well as many other devices. In the computer 100, for instance, the monitor 110, keyboard 120, mouse 130, the optical disk reader 150, and the floppy disk drive 140 will typically all be implemented as configurable PnP devices. For the sake of clarity and to further an appreciation for the scope of the invention, the method of the invention shall be disclosed with reference to the generic non-boot device 230.

Figure 3:
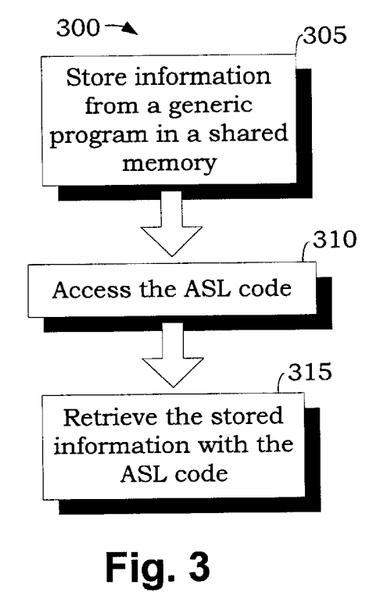
FIG. 3 illustrates one particular embodiment of a method for interfacing a generic program with the ASL code in an ACPI system in accordance with a first aspect of the resent invention.

FIG. 3 illustrates one particular embodiment of a method 300 for interfacing a generic program with the ASL code in an ACPI operating system in accordance with a first aspect of the present invention. The method 300 begins by storing information from a generic program in a shared memory as set forth in box 305. Next, the ASL code is accessed as set forth in box 310. Finally, as set forth in box 315, the stored information is retrieved with the ASL code.

Figure 4A:
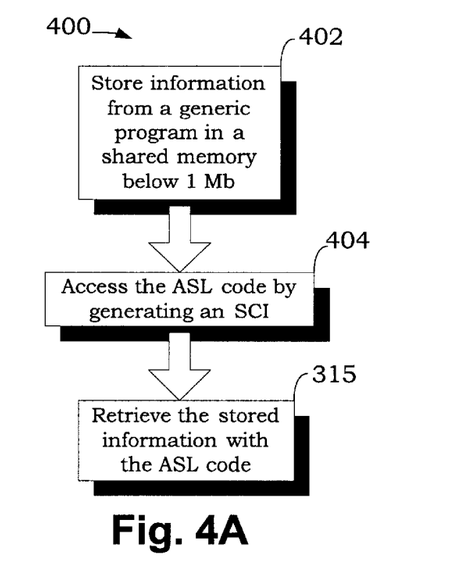
FIGS. 4A–4F illustrate variations on the method of FIG. 3.
Figure 4B:
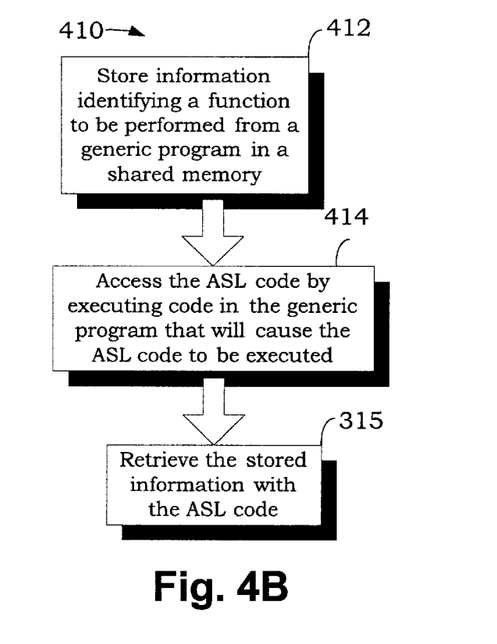
Figure 4C:
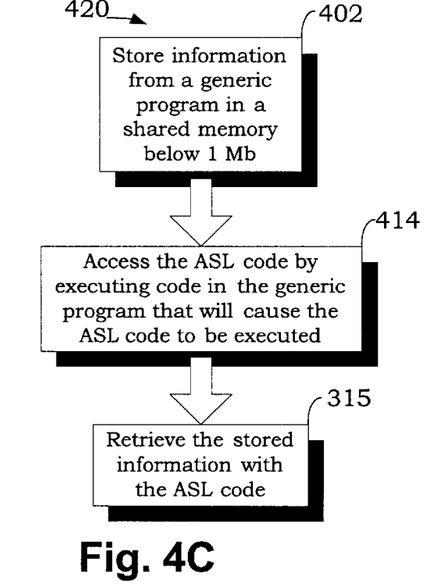
Figure 4D:
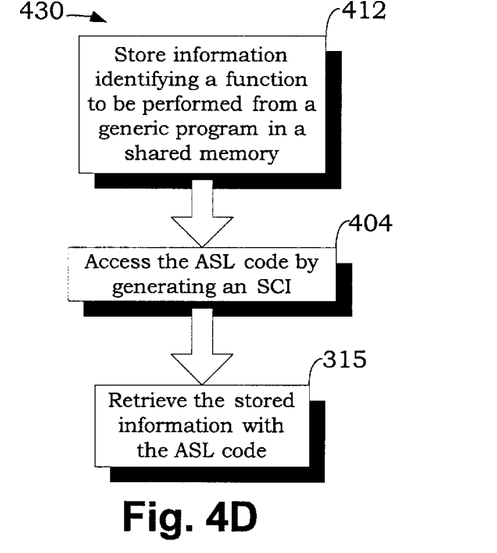
Figure 4E:
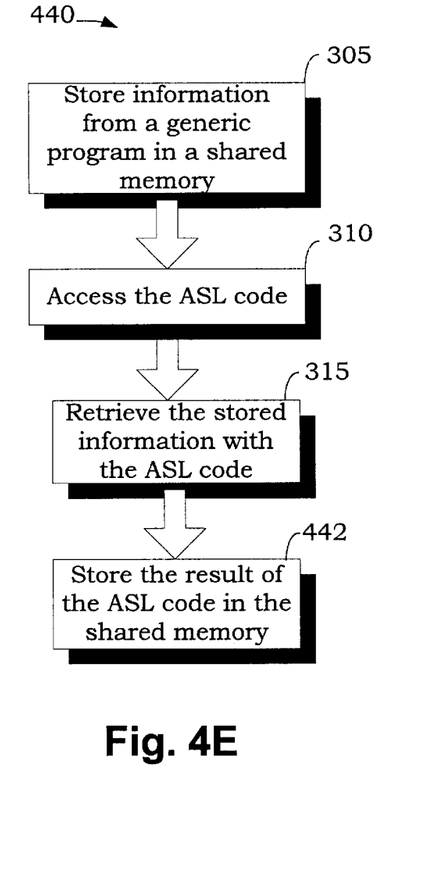
Figure 4F:
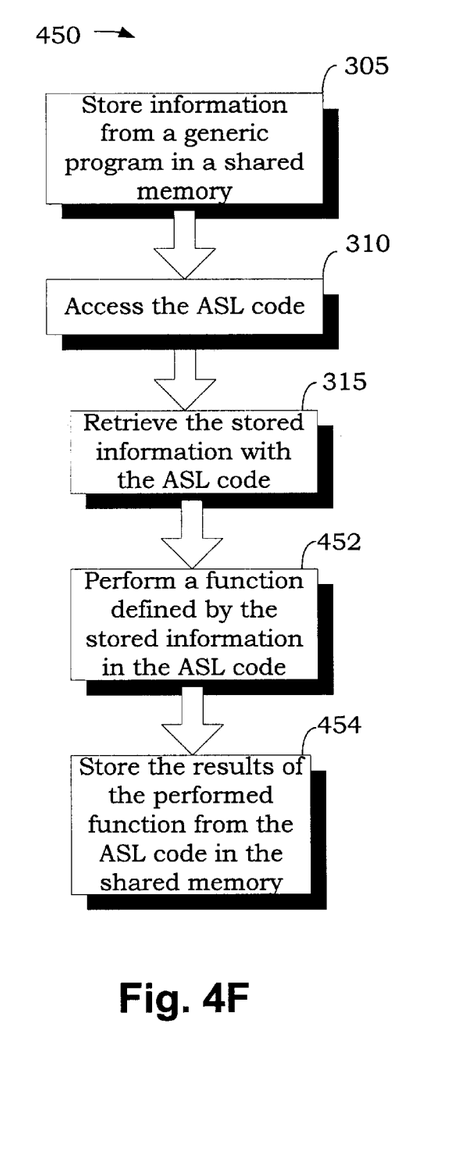

The first aspect, as embodied in the method 300, admits wide variation, many of which are illustrated in FIGS. 4A–4F. The method 300 in FIG. 3 and the methods 400, 410, 420, 430, and 440 in FIGS. 4A–4F contain many common parts, with like parts bearing like numbers. For instance, the generic program may be, in various alternative embodiments, a test program or an applications program. Still other variations include, but are not limited to, the following:

the information may be stored in the shared memory in a variety of ways, such as by storing information in a shared memory below 1 Mb, as set forth in box 402 of FIGS. 4A and 4C, or by storing a parameter identifying a function to be executed, as set forth in the box 412, of FIGS. 4B and 4D;

the ASL code may be accessed by generating an Software Controlled Interrupt ("SCI"), as set forth in the box 404 in FIGS. 4A and 4D, or by executing code in the generic program that will cause the ASL code to be executed, as set forth in box 414 in FIGS. 4B and 4C;

Alternative embodiments might also include additional steps. For instance, some other embodiments might permit the ASL code to store information in the shared memory that is then retrieved by generic program, as set forth in box 442 of FIG. 4E. The stored information might, in still other embodiments, specify a function to be performed by the ASL code that is subsequently performed, as set forth in the box 452 in FIG. 4F.

The method 300 discussed above in connection with FIG. 3, and the alternative embodiments in FIGS. 4A–4F, are implemented in software with varying degrees of hardware independence. Thus, these methods may be encoded on instructions on a computer readable program storage medium. Any suitable storage medium known to the art may be used. The medium may, for instance, be optical or magnetic and read only or read/write. Exemplary media include, but are not limited to, the program storage medium 220 of FIG. 2, the floppy disk 160 of FIGS. 1–2, and the optical disk 170 of FIGS. 1–2, as well as media not shown, such as magnetic tapes and paper tapes. Similarly, such encoded storage media may be used to program a computer to perform the method, such as the computer 100 in FIGS. 1–2. As noted above, however, the invention is not limited by the type of computer. Exemplary computer types include, but are not limited to, desktop personal computers, palmtop computers, laptop computers, and workstations.

Figure 5:
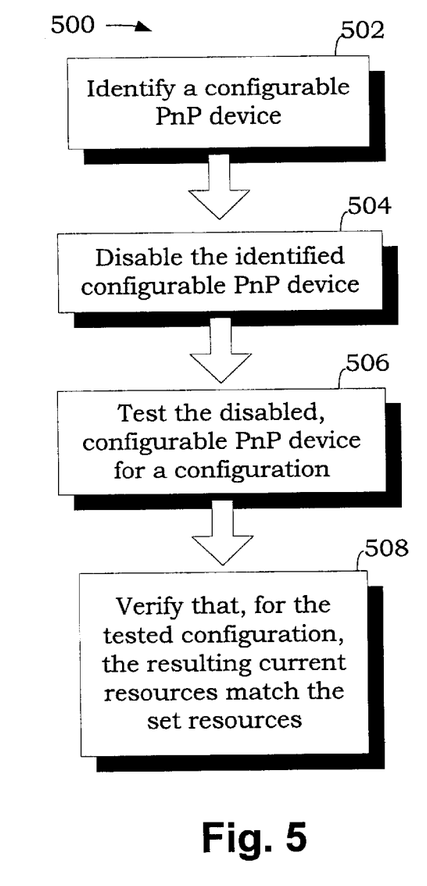
FIG. 5 illustrates one embodiment of a method for testing ASL PnP code.

One particular use for the invention is in testing ASL PnP code in an ACPI operating system. FIG. 5 illustrates one embodiment of a method 500 for testing ASL PnP code resident on a computer, such as the computer 100 of FIGS. 1–2. Like the methods of FIGS. 3–4F, the method 500 may be encoded onto a program storage medium with which a computer may be programmed.

Turning now to FIG. 5, the method 500 begins by identifying a configurable PnP device, such as the device 230 in FIG. 2, as set forth in the box 502. In one particular embodiment, each configurable PnP device in the computer is identified, but the invention is not so limited. A variety of techniques may be used to identify the PnP device and the selection of which technique will be somewhat implementation specific. In one particular embodiment in which the ACPI operating system is Windows®-based, this may be accomplished by reading the Possible Resource List ("_PRS") compiled during boot.

The method 500 continues by disabling the identified configurable PnP device, as set forth in the box 504. Techniques for disabling non-boot devices are well known in the art in the context of PnP systems, and these techniques may be used to implement this part of the method 500. However, the invention is not so limited. Any suitable technique as may become known to those skilled in the art having the benefit of this disclosure may be used. Where several configurable PnP devices are identified, each will typically by disabled to maximize flexibility in testing resource utilization. One exception might be Peripheral Component Interconnect, Interrupt Request ("PCI-IRQ") links, which might be useful in operating the computer during testing.

The method 500 continues by disabling the identified configurable PnP device, as set forth in box 504. Techniques for disabling non-boot devices are well known in the art in the context of PnP systems, and these techniques may be used to implement this part of the method 500. However, the invention is not so limited. Any suitable technique may be used. Where several configurable PnP devices are identified, each will typically be disabled to maximize flexibility in testing resource utilization. One exception might be Peripheral Component Interconnect, Interrupt Request ("PCI-IRQ") links, which might also be useful in operating the computer during testing.

Most embodiments will test each such device for each of its possible configurations. For instance, assume a serial port supports interrupt request 3 ("IRQ3") or interrupt request 4 ("IRQ4"), and I/O ports at addresses 3F8h or 2F8h. Most embodiments of the method 500 would set the serial port to and test each of the following configurations:

I/O 3F8h, IRQ 4;
I/O 3F8h, IRQ 3;
I/O 2F8h, IRQ 4;
I/O 2F8h, IRQ 3; and
disabled.

As noted earlier, however, some embodiments might test only a subset of these configurations.

After testing the configuration, the method 500 then concludes, in this particular embodiment, by verifying that the resulting current resources match the set resources. This will typically require the ASL PnP code to pass some information back to the ACPI operating system, as was discussed relative to boxes 442, 454 of FIGS. 4E–4F. However, this may not be required in all embodiments. The actions taken responsive to the outcome of the verification will be implementation specific.

Figure 6:
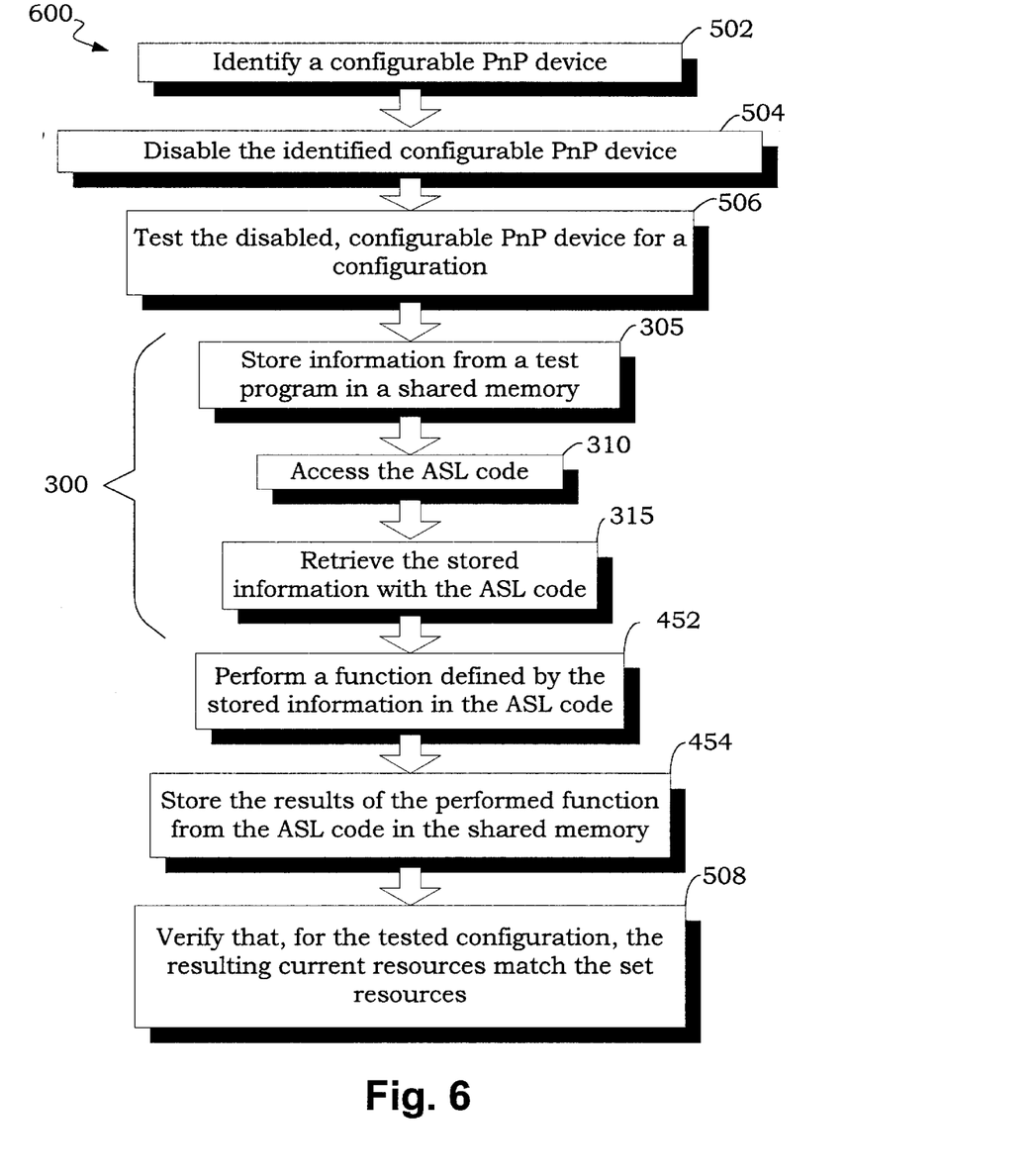
FIG. 6 illustrates one particular variation of the method in FIG. 5 incorporating various aspects of methods earlier discussed.

FIG. 6 illustrates one particular embodiment of a method 600 incorporating various aspects of methods earlier discussed. More particularly, the method 600 is a variant of the method 500 employing the method 300 of FIG. 3 to test the ASL PnP code. Like parts in the various figures bear like numbers.

In the method 600, the information is stored (box 305) by loading at least one parameter defining a function associated with a respective disabled, configurable PnP device into a shared memory. The parameter is loaded into shared memory below 1 Mb. Alternatively, the parameter could identify a function to be executed.

The ASL code is then accessed (box 310) by generating an SCI interrupt. The manner in which the SCI interrupt is generated will be implementation specific. For instance, in an ACPI operating system based on Windows®-98, the SCI interrupt may be generated by directly accessing an I/O port. In an ACPI operating system based on Windows® NT, the SCI interrupt may be generated by calling a driver and accessing the I/O port using the driver. Alternative to generating an SCI interrupt, in hardware independent implementations, the ASL code could be called.

The ASL code retrieves the stored information (box 315) and performs the function defined by the parameter. In this case, it is a test for every configuration of the device to determine its current resources. The result of the function is then returned, passing it through the shared memory (box 454). The returned result indicates the current resources of the tested device. Then, the method 600 verifies from the returned result that, for each tested configuration, the resulting current resources match the set resources (box 508).

The following code presents one particular embodiment of an ACPI Test Interface embodying the method 600 of FIG. 6. The ACPI Test Interface allows a test application to get, set, or disable any configurable ACPI PnP device nodes ("devnodes"). Data is passed between the ASL code and a test application via the following memory buffer at ACPI segment +3D0h (i.e. ACPI Segment=0E800h, so the table starts at 0EBD0:0).

| | | |
|---|---|---|
| Devnode Number | offset 000h | Number of devnode to process (1 based) |
| Devnode Function | offset 001h | 00h=Read devnode into table |
| | | 01h=Set Using Current Resources Buffer and read results into table |
| | | 02h=Disable devnode and read results into table. |
| Number of Devnodes | offfset 002h | Number of configurable devnodes |
| Current Resources | offset 003h-03Fh | Zero padded_CRS string |
| Possible Resources | offset 040h-13Fh | Zero padded_PRS string |
| Status | offset 140h-143h | 32 bit_STA result |

-continued

| | |
|---|---|
| HID | offset 144h-147h |
| UID | offset 148h-14Bbh |
| CID | offset 14Ch-14Fh |

The test application initiates the ACPI operation by updating the memory buffer, and triggering a runtime SCI event. On the PIIX4, a \GPE._L00 runtime event may be easily generated by toggling the thermal polarity bit in bit 2 of PM I/O 28h. The associated \GPE._L00 control method should toggle the polarity back to its default and process the ACPI test command in the memory buffer. Alternatively, the \GPE._L00 runtime event may be a software generated event.

The code below is an exemplary ACPI test application such as the \GPE._L00 runtime event discussed immediately above. The runtime event in this case is a USB wake-up event. The program displays the entire 150h byte test buffer on the screen and updates the screen every 100 milliseconds. The user may select a byte with the arrow keys, update a byte by pressing <Return> followed by the hex digits of the replacement byte. When the device number and device functions are correctly set, the selected command may be executed by simply pressing <Space>. To set a new device configuration, first get the devnode, next update the current resource string to the correct bytes, set the device function to set (01h), and finally press <Space>.

```
//*****************************************************************
//          _L00()
//          Method Functional Description:
//                  Execute software generated event.
//          Procedure:
//                  Execute software generated event.
//          Arguments:
//                  None
//          Returns:
//                  Nothing
//*****************************************************************
Method(_L00) {                              // test event occurred
    Store (DEVN, Local0)
    Store (Local0, P84h)                    // Display device number on Port 84
    Store (DEVF, Local1)
    Store (Local1, P85h)                    // Display device number on Port 85
    If (Lequal(Zero, THPO))
        {
        Store(One, THPO)
        }
    Else
        {
        If (Lequal(One, THPO))
            {
            Store(Zero, THPO)
            }}
    If (LEqual(Local0,0x1)){//LNKA
        If (LEqual(Local1, 0x1))            //Set Devnode
            {\_SB.LNKA._SRS(TCRS)}
        If (LEqual(Local1, 0x2))            //Disable Devnode
            {\_SB.LNKA._DIS()}
        Store(\_SB.LNKA._STA,TSTA)
        Store(\_SB.LNKA._HID,THID)
        Store(\_SB.LNKA._UID,TUID)
        Store(\_SB.LNKA._CRS,TCRS)
        Store(\_SB.LNKA._PRS,TPRS)
        }
    If (LEqual(Local0,0x2)){                //LNKB
        If (LEqual(Local1, 0x1))            //Set Devnode
            {\_SB.LNKR_SRS(TCRS)}
        If (LEqual(Local1, 0x2))            //Disable Devnode
            {\_SB.LNKR_DIS()}
        Store(\_SB.LNKR_STA,TSTA)
        Store(\_SB.LNKR_HID,THID)
        Store(\_SB.LNKR_UID,TUID)
        Store(\_SB.LNKR_CRS,TCRS)
        Store(\_SB.LNKB._PRS,TPRS)
        }
    If (LEqual(Local0, 0x3)){               //LNKC
        If (LEqual(Local1, 0x1))            //Set Devnode
            {\_SB.LNKC_SRS(TCRS)}
        If (LEqual(Local1, 0x2))            //Disable Devnode
            {\_SB.LNKC_DIS()}
        Store(\_SB.LNKC_STA,TSTA)
        Store(\_SB.LNKC_HID,THID)
```

```
            Store(\_SB.LNKC._UID,TUID)
            Store(\_SB.LNKC._CRS,TCRS)
            Store(\_SB.LNKC._PRS,TPRS)
            }
    If (LEqual(Local0, 0x4)){              //LNKD
        If (LEqual(Local1, 0x1))           //Set Devnode
            {\_SB.LNKD._SRS(TCRS)}
        If (LEqual(Local1, 0x2))           //Disable Devnode
            {\_SB.LNKD._DIS()}
        Store(\_SB.LNKD._STA,TSTA)
        Store(\_SB.LNKD._HID,THID)
        Store(\_SB.LNKD._UID,TUID)
        Store(\_SB.LNKD._CRS,TCRS)
        Store(\_SB.LNKD._PRS,TPRS)
        }
    If (LEqual(Local0, 0x5)){              //FDC0
        If (LEqual(Local1, 0x1))           //Set Devnode
            {\_SB.PCI0.IBRG.FDC0._SRS(TCRS)}
        If (LEqual(Local1, 0x2))           //Disable Devnode
            (\_SB.PCI0.IBRG.FDC0._DIS()}
        Store(\_SB.PCI0.IBRG.FDC0._STA,TSTA)
        Store(\_SR PCI0.IBRG.FDC0._HID,THID)
        Store(\_SB.PCI0.IBRG.FDC0._UID,TUID)
        Store (\_SB.PCI0.IBRG.FDC0._CRS,TCRS)
        Store(\_SB.PCI0.IBRG.FDC0._PRS,TPRS)
        }
    If (LEqual(Local0, 0x6)){              //LPT0
        If (LEqual(Local1, 0x1))           //Set Devnode
            {\_SB.PCI0.IBRG.LPT0.SRS(TCRS)}
        If (LEqual(Local1, 0x2))           //Disable Devnode
            {\_SB.PCI0.IBRG.LPT0._DIS()}
        Store(\_SB.PCI0.IBRG.LPT0._STA,TSTA)
        Store(\_SB.PCI0.IBRG.LPT0._HID,THID)
        Store(\_SB.PCI0.IBRG.LPT0._UID,TUID)
        Store(\_SB.PCI0.IBRG.LPT0._CRS,TCRS)
        Store(\_SB.PCI0.IBRG.LPT0._PRS,TPRS)
        }
    If (LEqual(Local0, 0x7)){              //ECP0
        If (LEqual(Local1, 0x1))           //Set Devnode
            {\_SB.PCI0.IBRG.ECP0.SRS(TCRS)}
        If (LEqual(Local1, 0x2))           //Disable Devnode
            {\_SB.PCI0.IBRG.ECP0._DIS()}
        Store(\_SB.PCI0.IBRG.ECP0._STA,TSTA)
        Store(\_SR PCI0.IBRG.ECP0._HID,THID)
        Store(\_SR PCI0.IBRG.ECP0._UID,TUID)
        Store(\_SB.PCI0.IBRG.ECP0._CRS,TCRS)
        Store(\_SB.PCI0.IBRG.ECP0 _PRS,TPRS)
        }
    If (LEqual(Local0, 0x8)){              //COM1
        If (LEqual(Local1, 0x1))           //Set Devnode
            {\_SB.PCI0.IBRG.COM1._SRS(TCRS)}
        If (LEqual(Local1, 0x2))           //Disable Devnode
            {\_SB.PCI0.IBRG.COM1._DIS()}
        Store(\_SB.PCI0.IBRG.COM1._STA,TSTA)
        Store(\_SB.PCI0.IBRG.COM1._HID,THID)
        Store(\_SB.PCI0.IBRG.COM1._UID,TUID)
        Store(\_SB.PCI0.IBRG.COM1._CRS,TCRS)
        Store(\_SB.PCI0.IBRG.COM1._PRS,TPRS)
        }
        If (LEqual(Local0, 0xE)){          //
        Store(\_SB.MBRD._CRS,TCRS)
        Store(\_SB.MBRD._HID,THID)
        }
    If (LEqual(Local1,1xF)){               //
        Store(\_SB.PCI0._CRS,TCRS)
        Store(\_SB.PCI0._HID,THID)
        }
    If (LEqual(Local0,0x10)){              //
        Store(\_SB.PCI0.SBD1._CRS,TCRS)
        Store(\_SB.PCI0.SBD1._HID,THID)
        }
    If (LEqual(Local0,0x11)){              //
        Store(\_SB.PCI0._PRT,TCRS)
        }
    Store (0xA,NUMD)          // Number of Devnodes
                              // End of Method (_L00)
```

However, there are many alternatives to this code that may be implemented in many alternative embodiments.

Thus, as will be appreciated by those skilled in the art having the benefit of this disclosure, the present invention is well suited to address the problems set forth above. Each of the individual configurations for each configurable PnP device may be thoroughly validated in an automated fashion. Too, an exhaustive list of possible configurations may be tested by the present invention. Still other advantages and uses for the present invention may become apparent to those skilled in the art upon reviewing the present disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for testing ASL PnP code in an ACPI system, comprising:
    identifying a configurable PnP device;
    disabling the identified configurable PnP device;
    testing the disabled, configurable PnP device for a configuration,
    wherein said testing includes setting the PnP device to each of multiple possible resource settings without user intervention; and
    verifying that for each possible resource setting, a resulting current resource setting matches the possible resource setting.

2. The method of claim 1, wherein identifying the configurable PnP device includes reading a list.

3. The method of claim 2, wherein reading the list includes reading a possible resource list.

4. The method of claim 1, wherein testing each disabled, configurable PnP device includes:
    loading at least one parameter defining a function associated with a respective disabled, configurable PnP device into a shared memory;
    generating an interrupt;
    performing the function defined by the parameter; and
    returning the result of the performed function,
    wherein the result reflects whether the current resource setting matches the possible resource setting.

5. The method of claim 4, wherein loading the parameter includes storing the parameter in a shared memory below one megabyte.

6. The method of claim 4, wherein generating the interrupt includes generating an SCI interrupt by accessing an I/O port.

7. The method of claim 6, wherein generating the SCI interrupt includes directly accessing the I/O port.

8. The method of claim 6, wherein generating the SCI interrupt includes:
    calling a driver; and
    accessing the I/O port using the driver.

9. The method of claim 4, wherein said verifying includes examining the returned result.

10. The method of claim 4, wherein returning the result of the performed function includes returning the result through the shared memory.

11. A computer-readable, program storage device encoded with instructions that, when executed by a computer, perform a method for testing ASL PnP code in an ACPI system, the method comprising:
    identifying a configurable PnP devices;
    disabling the identified configurable PnP device;
    testing the disabled, configurable PnP device for a configuration,
    wherein said testing includes setting the PnP device to each of multiple possible resource settings and said setting the PnP device to each of multiple possible resource settings is performed without user intervention; and
    verifying that for each possible resource setting, a resulting current resource setting matches the possible resource setting.

12. The program storage device of claim 11, wherein identifying the configurable PnP device in the encoded method includes reading a list.

13. The program storage device of claim 12, wherein reading the list in the encoded method includes reading a possible resource list.

14. The program storage device of claim 11, wherein testing each disabled, configurable PnP device in the encoded method includes:
    loading at least one parameter defining a function associated with a respective disabled, configurable PnP device into a shared memory;
    generating an interrupt;
    performing the function defined by the parameter; and
    returning the result of the performed function,
    wherein the result reflects whether the current resource setting matches the possible resource setting.

15. The program storage device of claim 14, wherein loading the parameter in the encoded method includes storing the parameter in a shared memory below one megabyte.

16. The program storage device of claim 14, wherein generating the interrupt in the encoded method includes generating an SCI interrupt by accessing an I/O port.

17. The program storage device of claim 16, wherein generating the SCI interrupt in the encoded method includes directly accessing the I/O port.

18. The program storage device of claim 16, wherein generating the SCI interrupt in the encoded method includes:
    calling a driver; and
    accessing the I/O port using the driver.

19. The program storage device of claim 14, wherein said verifying includes examining the returned result.

20. The program storage device of claim 14, wherein returning the result of the performed function in the encoded method includes returning the result through the shared memory.

21. A computer programmed to perform a method for testing ASL PnP code in an ACPI system, the method comprising:
    identifying a configurable PnP devices;
    disabling the identified configurable PnP device;
    testing the disabled, configurable PnP device for a configuration,
    wherein said testing includes setting the PnP device to each of multiple possible resource settings without user intervention; and
    verifying that for each possible resource setting, a resulting current resource setting matches the possible resource setting.

22. The computer of claim 21, wherein identifying the configurable PnP device in the programmed method includes reading a list.

23. The computer of claim 22, wherein reading the list in the programmed method includes reading a possible resource list.

24. The computer of claim 21, wherein testing each disabled, configurable PnP device in the programmed method includes:

loading at least one parameter defining a function associated with a respective disabled, configurable PnP device into a shared memory;

generating an interrupt;

performing the function defined by the parameter; and returning the result of the performed function, wherein the result reflects whether the current resource setting matches the possible resource setting.

25. The computer of claim 24, wherein loading the parameter in the programmed method includes storing the parameter in a shared memory below one megabyte.

26. The computer of claim 24, wherein generating the interrupt in the programmed method includes generating an SCI interrupt by accessing an I/O port.

27. The computer of claim 26, wherein generating the SCI interrupt in the programmed method includes directly accessing the I/O port.

28. The computer of claim 26, wherein generating the SCI interrupt in the programmed method includes:

calling a driver; and accessing the I/O port using the driver.

29. The computer of claim 24, wherein verifying that the resulting current resources match the set resources in the programmed method includes examining the returned result.

30. The computer of claim 24, wherein returning the result of the performed function in the programmed method includes returning the result through the shared memory.

31. A method for testing ASL PnP code in an ACPI system, comprising:

identifying a plurality of configurable PnP devices, including reading a possible resource list of configurable PnP devices;

disabling each identified, configurable PnP device;

testing each disabled, configurable PnP device for a plurality of resource settings, wherein the testing for each disabled PnP device, includes:

setting the PnP device to each of the plurality of resource settings without user intervention;

loading at least one parameter defining a function associated with a respective disabled, configurable PnP device into a shared memory below one megabyte;

generating an SCI interrupt, including one of:

directly accessing the I/O port; and accessing the I/O port through a called driver;

performing the function defined by the parameter; and returning the result of the performed function through the shared memory; and verifying from the returned result that, for each tested configuration for each disabled, configurable PnP device, the resulting current resources match the set resources.

32. A method for testing ACPI source language code, comprising:

storing information from a test program in a shared memory; accessing the ASL code;

retrieving the stored information with the ASL code;

storing a result generated by the ASL code in the shared memory; and retrieving the result with the test program, wherein the result reflects whether the current resources match desired resources.

* * * * *